United States Patent [19]

Carmichael et al.

[11] 4,425,004

[45] Jan. 10, 1984

[54] BANDED VEHICLE HUB

[75] Inventors: William E. Carmichael, 2592 McBride Crescent, Prince George, B.C., Canada; Wayne Rodacker, Grande Prairie, Canada

[73] Assignee: William E. Carmichael, Prince George, Canada

[21] Appl. No.: 334,323

[22] Filed: Dec. 24, 1981

Related U.S. Application Data

[63] Continuation-in-part of Ser. No. 75,514, Sep. 13, 1979, Pat. No. 4,315,360.

[51] Int. Cl.³ .............................................. B21K 1/34
[52] U.S. Cl. ..................................... 301/8; 301/12 R; 301/13 SM; 301/66; 29/159.03
[58] Field of Search ............ 301/8, 10 R, 11 R, 12 R, 301/13 R, 13 SM, 18, 19, 20, 36 R, 65–66, 105 R, 64 R, 64 SD, 64 SH, 67; 29/159.03

[56] References Cited

U.S. PATENT DOCUMENTS 2,553,161  5/1951  Ash ................................ 301/64 R X
2,734,778  2/1956  Cook ....................................... 301/8
3,013,841  12/1961  Walther .......................... 301/13 SM
4,315,360  2/1982  Carmichael et al. ............... 301/8 X

FOREIGN PATENT DOCUMENTS 2554235  6/1977  Fed. Rep. of Germany .... 301/11 R

Primary Examiner—Robert B. Reeves
Assistant Examiner—Russell D. Stormer
Attorney, Agent, or Firm—Carver & Co.

[57] ABSTRACT

Prior art truck hub has central boss with central axis, a plurality of spokes extending from the boss, and webs extending between the spokes. End faces of spokes commonly crack and by using method of repair the hub can be salvaged by removing from outer end of each spoke, a generally U-sectioned portion of end face and adjacent portions of spoke to form a pair of spaced shoulders on side portions of spoke. An annular rim or band is fitted on shoulders so that cylindrical inner face of band is adjacent generally axial edges of shoulders, and annular end face of band is adjacent radial edges of shoulders and partially annular edges of outer faces of spokes. Band is welded to ends of spokes to provide additional support for tire bearing rim.

7 Claims, 6 Drawing Figures

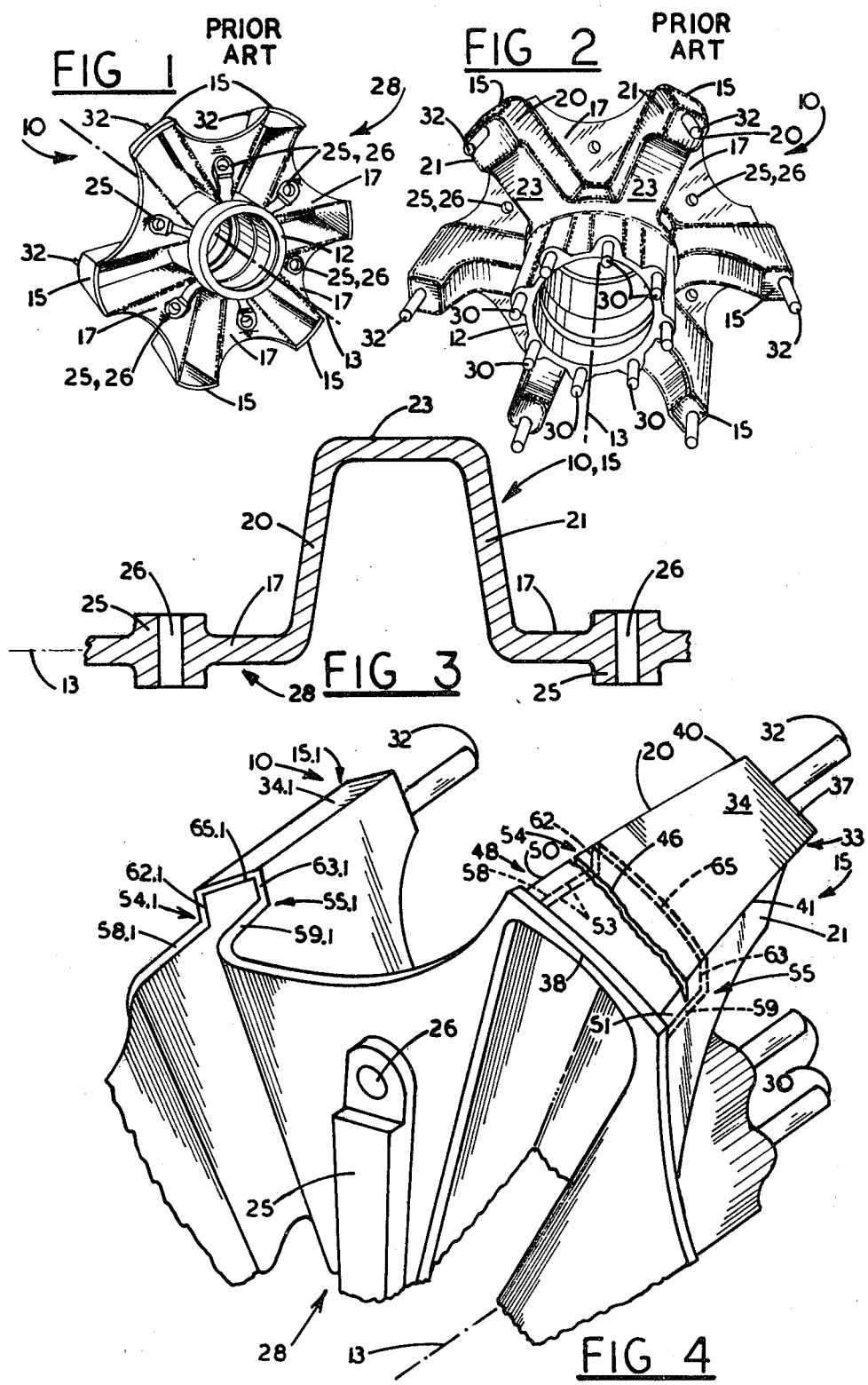

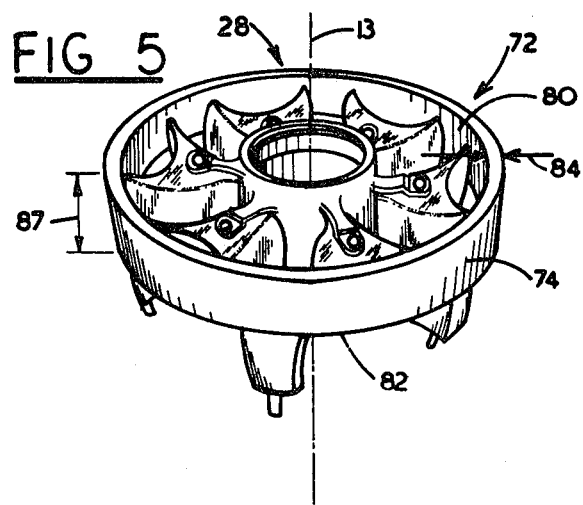
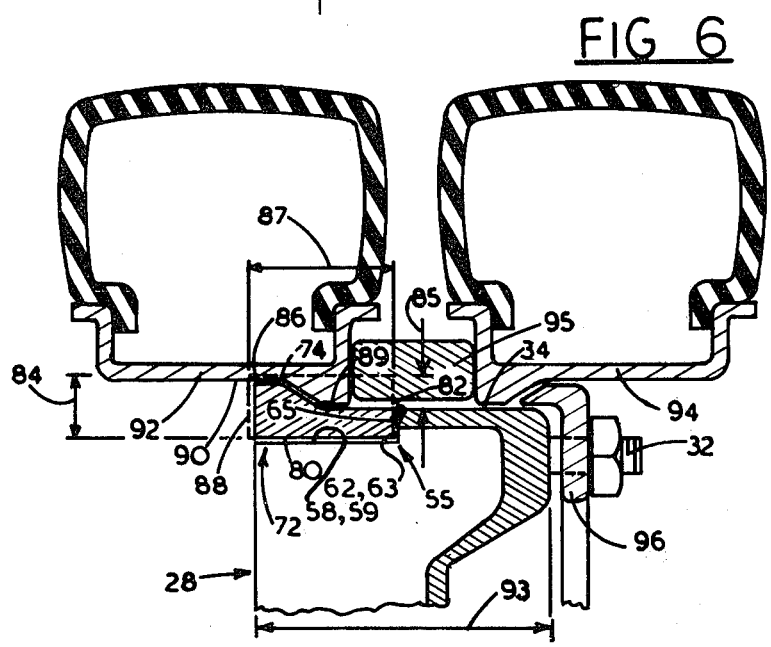

BANDED VEHICLE HUB

CROSS REFERENCE TO RELATED APPLICATIONS

This is a continuation-in-part of U.S. patent application Ser. No. 06/075,514, filed Sept. 13, 1979 now U.S. Pat. No. 4,315,360 in TRUCK HUB AND METHOD OF BANDING SAME.

BACKGROUND OF THE INVENTION

1. Field of the Invention

The invention relates to a method of repairing or strenghening a truck hub, and the resulting hub itself.

2. Prior Art

Cast metal truck hubs have been used for many years and, particularly in off-road applications, some particularly well known makes have a relatively short service life. A typical hub has a central boss, a plurality of spokes extending from the boss and webs extending between the spokes, the spokes carrying studs for securing a tire rim. A common failure is cracking of outer end faces of the spokes where they contact a tire rim. Some parties feel that the cracking occurs due to high loading pressure acting on the end face of the spoke, the pressure causing a crack to extend between side portions of the spokes generally within a diametrical plane of the hub. To the inventor's knowledge, no really satisfactory repairs have been made to these hubs which would result in any material extension of service life of the hub.

SUMMARY OF THE INVENTION

The invention reduces difficulties and disadvantages of the prior art by providing a relatively simple and low cost repair to the hub, in many cases the repair resulting in a repaired hub having a service life of up to three or four times as long as an original, unrepaired hub. The repair has proven so successful in some instances that new hubs, before being fitted on a vehicle, are modified by the method according to the invention so as to result in a hub having a longer service life. The repair procedure is simple, requires little specialized equipment and skill, and usually results in a repaired hub which can cost less than half the price of a new hub, whilst providing at least up to three or four times the normal service life of a new hub.

A method of repair or salvage is for making a banded truck hub from an existing truck hub. The existing truck hub has a central boss with a central axis, a plurality of spokes extending from the boss, and webs extending between the spokes. Each spoke has a pair of side portions and a front portion blending smoothly together so as to be generally U-sectioned. Each spoke also has an outer end having a partially cylindrical outer end face adapted to fit adjacent a tire rim. The outer end face is defined in part by front and rear edge portions and outer margins of the side portions of the spokes. The method is further characterized by removing from the outer end of each spoke adjacent the rear edge portion, a generally U-sectioned portion of the cylindrical outer end face and adjacent portions of the side portions of the spoke adjacent the outer margin thereof. This forms a pair of spaced shoulders on the side portions of the spoke. The shoulders are defined by exposed, generally axial edges of the side portions spaced generally equally from the central axis, and also by exposed, generally radial edges of the side portions which are generally coplanar with a partially annular exposed edge of the cylindrical outer end face of the spoke. An annular rim as a preformed ring is welded onto the shoulders of each spoke so that an inner face of the rim is adjacent the exposed generally axial edges of the side portions, and a generally annular end face of the rim is adjacent the radial edges of the side portions and the partially annular edges of the outer cylindrical end faces of the spokes. The annular rim is then machined to provide an outer face to accept the tire rim.

A banded hub according to the invention is adapted to fit within and to support a tire rim generally complementary to the hub. The hub has a central boss with a central axis, a plurality of spokes extending from the boss, and webs extending between the spokes. Each spoke has means to secure the tire rim thereto, an outer end, and a pair of side portions and a front portion blending smoothly together so as to be generally U-sectioned. The hub also has an annular rim formed as a preformed ring and having an outer face adapted to be accepted within an inner face of the tire rim, and an inner face welded to the outer ends of the spokes.

A detailed disclosure following, related to the drawings, describes a preferred method and apparatus according to the invention, which is capable of expression in method and apparatus other than that particularly described and illustrated.

DESCRIPTION OF THE DRAWINGS

FIG. 1 is a simplified perspective of a rear face of a prior art truck hub, prior to modification by the invention, FIG. 2 is a simplified perspective of a front face of a prior art truck hub, prior to modification by the invention, FIG. 3 is a simplified fragmented section through a spoke of a prior art truck hub, the section being within a plane disposed generally tangentially to the hub, FIG. 4 is a fragmented perspective showing a common crack location, and a resulting intermediate modification according to the invention of portions of two spokes of the truck hub, FIG. 5 is a simplified perspective showing a rear face of the hub fitted with the annular rim or band according to the invention, the band being shown prior to machining, FIG. 6 is a simplified fragmented section in a generally radial plane showing a portion of the hub joined to the band of the invention, the band shown before machining in broken outline, and after machining in full outline and cooperating with two tire rims.

DETAILED DISCLOSURE

FIGS. 1 through 3

A prior art truck hub 10 has a central boss 12 with a central axis 13, a plurality of spokes 15 extending from the boss, and a plurality of webs 17 extending between the spokes. As seen best in FIG. 3, each spoke has a pair of side portions 20 and 21 and a front portion 23 blending smoothly together so as to be generally U-sectioned. The webs carry web bosses 25 having openings 26 therein to accept bolts for securing a brake drum, not shown, to a rear face 28 of the hub. A plurality of studs 30 extend axially from the boss 12 to receive a bearing cap, not shown. A plurality of studs 32 extend axially from outer ends of the spokes for securing one or two tire rims, not shown, to the hub, which rims are adapted to carry road bearing tires.

FIG. 4

An outer end 33 of a typical spoke 15 has a partially cylindrical outer end face 34 adapted to fit adjacent the tire rim, the outer face being defined in part by front and rear edge portions 37 and 38 respectively and outer margins 40 and 41 of the side portions 20 and 21 of the spokes. The above describes a typical truck hub, as used in large numbers on heavy duty trucks, particularly off-road logging and gravel trucks. One make similar to that described is known as the Dayton truck hub, as manufactured by the Dayton Steel Foundry of Dayton, Ohio, U.S.A. The Dayton truck hub is commonly a cast steel structure and, when used in heavy duty off-road conditions, has been known to suffer from a relatively short service life. Referring to FIG. 4, after much use in these adverse conditions, a crack 46 commonly extends across the end face 34 and sometimes into the side portions 20 and 21 of one or more spokes and normally the hub would be discarded when so cracked. A method according to the invention permits the salvaging of such hubs and, when salvaged according to this method, the salvaged or banded hub has commonly been found to have an extended service life of about three or four times the life of a new hub. To take advantage of the extended life of the banded hub when compared to a new hub, this method has also been used extensively for converting new hubs, even before fitting on a vehicle, into banded truck hubs according to the invention. The method of salvaging and resulting salvaged hub according to the invention is described for a Dayton truck hub, but it could be modified for similar types of hubs.

METHOD OF REPAIR OR MODIFICATION

FIG. 4

Preferably using an oxygen cutting torch, a generally U-sectioned portion 48 containing a portion of an end of the spoke is removed from each spoke. The portion 48 includes a portion of the cylindrical outer end face 34 and adjacent portions 50 and 51 of the side portions 20 and 21. A double broken line designated 53 is shown extending around the relevant portions indicating an approximate line of the cut. It can be seen that a portion of the cut extending across the outer end face 34 is spaced sufficiently forwardly of the crack 46 so that after removal of the portion 48, the crack is not apparent. Similarly, shorter cuts across the side portions 20 and 21 are positioned sufficiently remote from the crack so that when the portion 48 is removed, evidence of the crack is removed. When the portion 48 is removed, a pair of spaced shoulders 54 and 55 are formed on the spoke side walls 20 and 21 respectively. The shoulders 54 and 55 are defined by exposed, generally axial edges 58 and 59 respectively which are spaced generally equally from, and disposed generally parallel to, the central axis 13 of the boss. The shoulders 54 and 55 are also defined by exposed, generally radial edges 62 and 63 of the side portions 20 and 21 which are disposed generally within a common diametrical plane, not shown, centered on the central axis. A partially annular exposed edge 65 of the cylindrical outer face 34 of the spoke is also exposed and this is also generally coplanar with the common diametrical plane containing the edges 62 and 63 of the shoulder 54 and 55.

An adjacent spoke 15.1 is shown after removal of the corresponding U-sectioned portion, and portions of the spoke 15.1 corresponding to similar portions of the spoke 15 are identified by addition of 0.1 to the corresponding annotation. Thus, the spoke 15.1 has shoulders 54.1 and 55.1 defined by axial edges 58.1 and 59.1 and radial edges 62.1 and 63.1. A partially annular edge 65.1 of the cylindrical outer end face 34.1 is generally coplanar with the radial edges 62.1 and 63.1 and generally within the common diametrical plane centered on the central axis.

The plurality of spokes 15 remaining are similarly modified to produce the corresponding shoulders so that a generally cylindrical surface centered on the axis 13 would contain the axial edges, and a common diametrical plane centered on the axis 13 would contain the radial edges of the shoulders of each spoke, and also the partially annular edges of the outer end faces of each spoke.

FIGS. 5 and 6

The modification to the existing hub is completed by fitting an annular rim or band 72 to enclose the spoke. The rim is a preformed ring which is preferably fabricated from a flat bar which is rolled into a ring and then adjacent ends thereof are welded. Whilst other methods of fabricating the ring are available this is the preferred method as it results in an essential wrought ring which has the necessary strength due to the metallurgical grain properties whilst increasing weight only slightly. The rim is a preformed ring which is secured to the spokes so as to increase bearing area at outer ends of the spokes and to increase rigidity of the outer ends of the spokes. The rim 72 is shown in FIG. 5 after fitting on the shoulders and prior to matching and has a generally cylndrical outer face 74. The annular rim has a generally cylindrical inner face 80 which is fitted adjacent the recently exposed, generally axial edges 58 and 59 of each of the side portions of the spokes. The annular rim also has a annular end face 82 which is fitted adjacent the generally radial edges 62 and 63 of the side portions of the spoke, and also adjacent the partially annular edge 65 of the outer cylindrical face 34. As best seen in FIG. 6, before machining the annular rim has a thickness 84 such that a projecting portion 85 stands proud of the face 34 to provide machining allowance for forming a lip 86 adjacent the rear face 28. Before machineing, the annular rim 72 also has a width 87 defined as space between annular end faces 82 and 88 which is sufficient for the rim to extend from the radial edges 62 and 63 so that the face 88 stands proud of the rear face 28 of the existing hub to provide machining allowance.

The rim is secured to each spoke, suitably by fillet welding along the corresponding edges 62 and 63, 58 and 59, and 65. Before welding, care is taken to ensure that the inner face 80 is positioned relative to the hub so as to be essentially concentric with the axis 13. Typically, each spoke is tack welded in several locations to the inner face of the annular rim to ensure concentricity with the axis 13. Then end faces of spokes are welded to the annular rim using continuous weld beads. The width 87 of the annular rim is approximately one-half of axial width 93 of the hub, and thus considerably increases strength of the hub when compared with the prior art unbanded hub.

After welding, the hub is centered in a lathe relative to the axis 13 and the outer face 74 and end face 88 are machined to assume a profile 89, which is shown in FIG. 6 in full outline, and is thus concentric with the axis 13. The outer face of the rim when machined as above is now very similar to that of the outer end faces of the spokes only of the original hub. Thus when the outer face is machined as shown, it is adapted to be accepted within and to engage an inner face 90 of an inside tire rim 92. The hub is shown supporting dual tire rims 92 and 94 and a prior art optional spacer 95 and a prior art wedge mounting lug 96 are used as before to secure the tire rims to the hub.

Thus, in summary, the annular rim 72 is secured to the spokes to form a spoked hub with a continuous banded rim, after which the outer face of the annular rim is machined to assume the profile 89 which accepts an inner face 90 of the tire rim 92. The additional strength appears to result from use of a ring or band of essentially wrought material with high strength and is welded to a hub of cast material which usually has a lower strength. Clearly the advantage of the wrought ring could be attained when used with hubs of noncast material, for example pressed steel hubs.

ALTERNATIVES AND EQUIVALENTS

Before machining, the annular rim is shown to have generally cylindrical inner and outer faces 80 and 74 with parallel annular end faces 82 and 88 centered on the axis 13. After machining, the profile 89 of the outer and end face is selected to be compatible with the tire rim. In this case a forward portion of the profile 89 is a shallow tapering cone which can be easily made from an annular rim having cylindrical faces. Clearly, in an alternative, if the shape of the truck tire rim to be engaged is a relatively steeply inclined cone, before machining the annular rim could be a portion of a truncated cone to reduce machining allowance. For compatibility with a truncated conical rim, the radial edges 62 and 63 of the shoulder would be at an angle to the axis 13 other than a right angle, and the axial edges 58 and 59 would be disposed at an angle to the axis 13 complementary to angle of the cone.

We claim:

1. A banded hub adapted to fit within and to support a tire rim generally complementary to the hub, the hub having a central boss with a central axis, a plurality of spokes extending from the boss, and webs extending between the spokes; each spoke having means to secure the tire rim thereto, an outer end, and a pair of side portions and a front portion blending smoothly together so as to be generally U-sectioned, the hub being characterized by:
    (a) an annular rim formed as preformed ring and having an outer face adapted to be accepted within an inner face of the tire rim, and an inner face welded to the outer ends of the spokes.

2. A hub as claimed in claim 1 further characterized by:
    (a) the outer end of each spoke having a pair of spaced shoulders, the shoulders being defined by generally axial edges of the side portions which are spaced generally equally from the central axis,
    (b) the inner face of the annular rim being complementary to and adjacent the axial edges of the side portions.

3. A hub as claimed in claim 2 further characterized by:
    (a) each spoke having a partially cylindrical outer face adapted to fit adjacent a tire rim, the outer face being defined in part by front and rear edge portions and outer margins of the side portions of the spokes,
    (b) the shoulders also being defined by generally radial edges of the side portions which are generally coplanar with a partially annular edge of the cylindrical outer face of the spoke,
    (c) the annular rim having an annular end face complementary to and adjacent the radial edges of the side portions and the partially annular edges of the outer faces of the spokes.

4. A hub as claimed in claim 3 further characterized by:
    (a) the annular rim having a width which is approximately equal to one-half of the axial width of the outer end faces of the spokes.

5. A hub as claimed in claim 2 or 3 in which outer ends of the spokes are further characterized by:
    (a) the generally axial edges of the side portions are disposed generally parallel to the central axis of the hub.

6. A hub as claimed in claim 3 in which the outer ends of the spokes are further characterized by:
    (a) the generally radial edges of the side portions are disposed generally within a common diametrical plane centered on the central axis and generally coplanar with the partially annular face of the cylindrical outer face.

7. A hub as claimed in claim 1, 2 or 3 further characterized by:
    (a) the boss, spokes and webs are cast material,
    (b) the band is wrought material.

* * * * *